Patented Nov. 7, 1933

1,933,791

UNITED STATES PATENT OFFICE 1,933,791

METHOD OF DETECTING LEAKS IN A CLOSED GAS SYSTEM

Harold W. Crouch, Rochester, N. Y., assignor to Eastman Kodak Company, Rochester, N. Y., a corporation of New York No Drawing. Application March 20, 1931
Serial No. 524,225

2 Claims. (Cl. 23—230)

My invention relates to air circulation systems, and particularly to a method for determining leaks in such systems.

In many processes, such as the manufacture of artificial silk, photographic film, rubber coated materials and the like, and the coating of paper and fabrics with pyroxylin, oils or varnishes in which a plastic or other material dissolved in a solvent is dried in a closed air circuit so arranged that the solvent may be recovered from the air and the same air used again for evaporating the solvent, it is very important to reduce all leakage to a minimum in order to avoid losses of valuable solvent materials.

It is an object of my invention to provide a method for detecting leakage and for determining the amount thereof in such a system. This object may be attained by introducing into the closed gas system a suitable amount of gas, analyzing the air from time to time for the gas introduced, and determining the amount of leakage in the system from the percentage decrease of the gas introduced.

Other objects and advantages of my invention will be apparent to those skilled in this art from the following description.

My invention may be carried out by introducing into the air stream of a closed recovery system a suitable amount of an inert gas, such as hydrogen or helium for which the air can be analyzed with considerable accuracy. The inert gas content of the air in the closed system is determined in some convenient way such as knowing the volume of the system and measuring the amount of gas introduced or analyzing the air for the gas soon after it is introduced. The original gas content of the air being known, the air in the system is analyzed from time to time for the gas introduced, and if the gas content remains constant, the air circulation system is known to be without leakage. If at any time the analysis shows a decrease in the gas content then the percentage of gas which disappears in a given time is equal to the percentage of the total air in the system which leaks out or in, in the same length of time. Obviously the measure of the air leakage is a measure of the leakage of valuable solvents and if such leakage becomes too great, steps may be taken to prevent it.

I prefer to use hydrogen or helium for the inert gas because they are not absorbed in ordinary solvent recovery systems, and the air may be analyzed for them with extreme accuracy by means of ordinary thermal conductivity apparatus. However, other gases may be used and any suitable method for analyzing the air for the gas may be used without departing from my invention.

It will be seen that I have provided a method for detecting and determining leaks in a closed air system whereby the operator of such a system is at all times informed as to the exact conditions under which the system is operating, which may be of prime importance where it is desirable to know what is taking place, and whether or not valuable solvents are being lost.

My invention has been described as applied to solvent recovery systems, but it will be obvious that it is equally applicable to any closed systems in which it is desirable or important for the operator to know if any leaks are present, and, if present, to know their magnitude.

While I have described one way of carrying out my invention to comply with the requirements of the statutes, I wish it understood that I do not intend to be limited to the exact method and application described inasmuch as, in view of the disclosure, obvious modifications and other applications will readily suggest themselves to those familiar with this art without departing from the spirit of my invention or the scope of the claims herein.

What I claim as new and desire to secure by Letters Patent of the United States is:

1. The method of determining leakage in a closed gas system which comprises introducing into the system a gas not otherwise present therein in sufficient quantity to be readily analyzable, analyzing the resulting mixture from time to time for the gas introduced and determining the leakage of the system from the change in the composition of the mixture.

2. The method of determining the leakage in the closed air circuit of a solvent recovery system which comprises introducing into said air circuit a definite amount of an easily analyzable gas not otherwise present therein in substantial quantities, analyzing the air in said circuit for the gas introduced and utilizing the decrease in the amount of the gas present for determining the leakage of the air circuit.

HAROLD W. CROUCH.